United States Patent

Bahm et al.

[11] Patent Number: 5,685,263
[45] Date of Patent: Nov. 11, 1997

[54] LIVESTOCK LIFT APPARATUS

[76] Inventors: Vernon L. Bahm, R.R. 1, Box 103F; Jason B. Bahm, 2745 35th St.; Donald J. Beehler, 230 14th St. NE., all of Mandan, N. Dak. 58554

[21] Appl. No.: 405,794
[22] Filed: Mar. 16, 1995
[51] Int. Cl.⁶ ................................................. A01K 29/00
[52] U.S. Cl. ............................................................ 119/728
[58] Field of Search ................................. 119/725, 728; 294/106; 269/238

[56] References Cited

U.S. PATENT DOCUMENTS

| 2,743,701 | 5/1956 | Boyd | 119/728 |
| 2,909,153 | 10/1959 | McKinley et al. | 119/728 |
| 3,827,406 | 8/1974 | Berns | 119/728 |

FOREIGN PATENT DOCUMENTS 819829  9/1959  United Kingdom.

Primary Examiner—Robert P. Swiatek
Attorney, Agent, or Firm—Moore & Hansen

[57] ABSTRACT

A livestock lift apparatus comprises two U-shaped gripping arms hinged together at their open ends. The rounded ends of the gripping arms are bent toward each other. A locking mechanism comprises a locking handle rotatably mounted to locking handle mount plates carried by a cross member of one of the gripping arms, a chain catch rotatably mounted on the locking handle, a length of chain engageable by the chain catch, the chain attached to an eyelet of a threaded ready rod extending through a hole in a cross member carried by the other gripping arm, and adjustment handle threaded to the ready rod. The lift apparatus is place over the hip sockets of a cow and tightened and adjusted with the locking mechanism to securely hold the cow's hip sockets for rehabilitation, lifting, and transport.

9 Claims, 1 Drawing Sheet

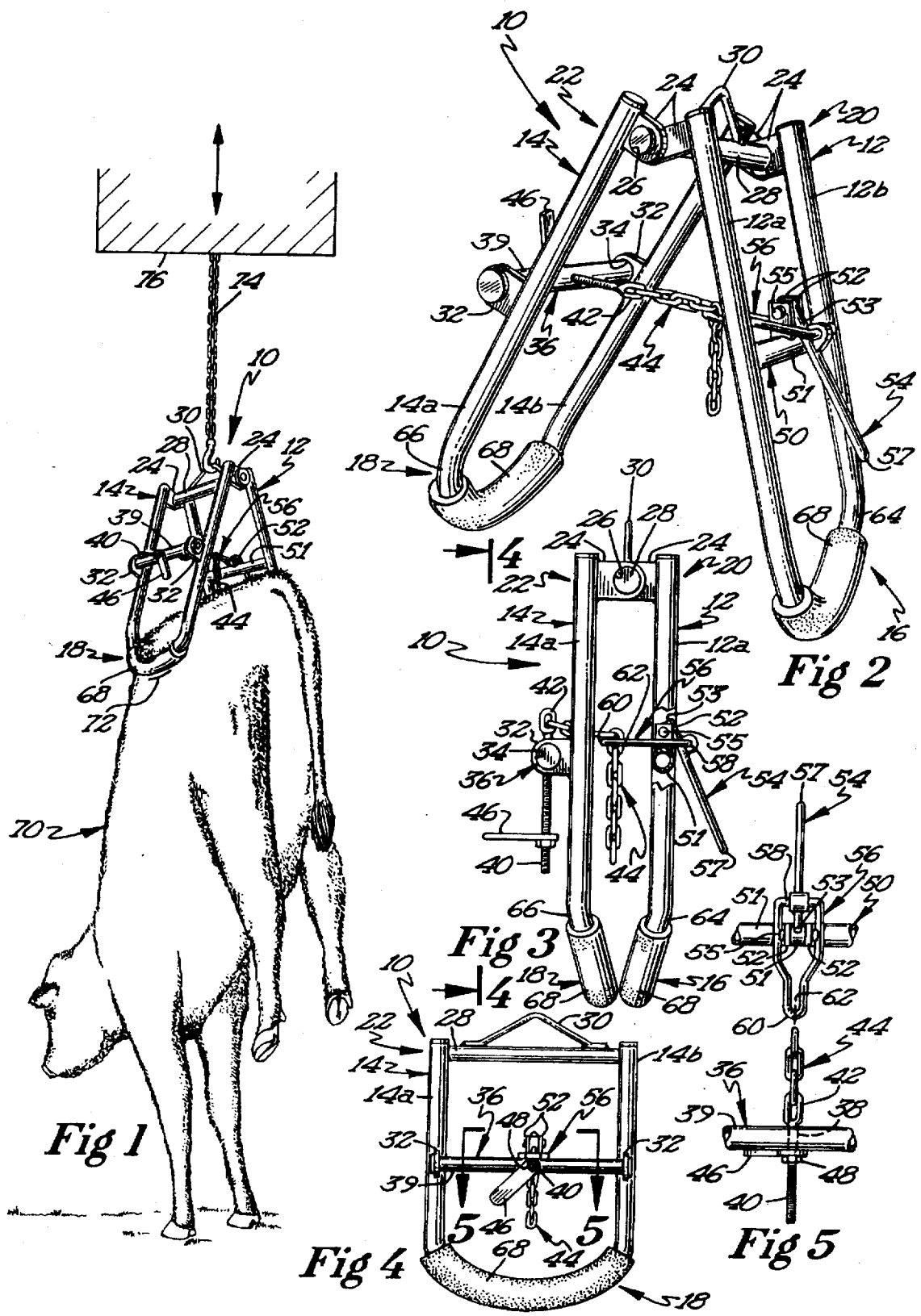

LIVESTOCK LIFT APPARATUS

BACKGROUND OF THE INVENTION

The present invention relates to the field of livestock lifting and transporting apparatuses. Specifically, it relates to cow hip lifters.

It is common for cattle to fall on slippery or icy surfaces. Further, pregnant cows fall more easily, even under ideal conditions. When such a fall occurs, the cow may be injured and may be unable to get up, or may simply remain in the non-upright position.

When cattle do remain in a non-upright position under such circumstances, their blood circulation is reduced, and the muscles in their legs and hips tend to stiffen, preventing the cattle from standing up. Such fallen cattle are unable to feed or to return to a barn or other housing area. Since cattle can reach weights in excess of 2,000 pounds, and even small cattle often reach weights of 1,000 pounds, it is impossible for a farmer to physically raise the cattle to a standing position without some form of mechanical assistance.

In order to provide such assistance, a number of devices have been used to help raise cattle from a prone to a standing position. For example, a system has been used in which a plurality of straps are placed under the torso of the cow, and the straps are attached to a lifting device such as a front-end loader or other lift. These straps have several major disadvantages. Cows tend to struggle and fight when such straps are used to lift them, and often injure themselves further. Additionally, the positioning of the jugular vein in the body of a cow results in these types of straps cutting off circulation to the jugular vein of the cow, which can also cause further and serious injury.

In order to take advantage of the fact that cows stand up back end first, a device for assisting the rear hips of a cow into an upright position was developed. Almost all past and current devices of this type use a hip lifter constructed of relatively light metal pipe with appendages or arms designed to fit over the hip socket of the cow, and which can be marginally tightened to allow the cow to be assisted into an upright position. Typically, the appendages that fit over the cow hip joints have been U-shaped, with the rounded end adjacent the cow's hip. The two arms of a standard hip lifter are hinged together opposite the rounded ends, and therefore can hinge open into a configuration similar to an A-frame. The arms are typically straight.

Several schemes exist for tightening these hip lifters about the hip socket of the fallen cow. One prior art hip lifter has a threaded rod connecting the two arms. To adjust the tension of the hip lifter on the cow, the threaded rod is screwed like a screw jack. Another tightening scheme on a different hip lifter is a chain that may be hooked to a hook on the opposite arm of the hip lifter. These methods of providing tension have several drawbacks. While the threaded rod may be useful for some level of fine adjustment, it is unwieldy and slow for large adjustments. Because the size of cows varies so greatly, use of a threaded rod tightener is slow and inefficient. The hook and chain method for tightening does not allow a fine adjustment. The tension or separation intervals are limited by the size of the chain.

Further, the A-frame configuration and straight arms of the prior art hip lifters become increasingly more difficult to use effectively as the size of the cow increases. The bigger the cow, the easier it is for a straight armed hip lifter to slip off of the hip socket of the cow, potentially furthering the cow's injury by allowing it to fall. Therefore, such hip lifters become ineffective for raising larger cattle to a standing position. These A-frame hip lifters have a large angular gap between arms and do not grip or conform well to the contours of a larger cow.

In the interests of providing a lightweight hip lifter, the prior art has used light materials, generally metal pipe. Such lightweight pipe may be effective in the assisted lifting of small cows of about 1,000 to 1,200 pounds, but the large weight of many of today's cattle, upwards of 2,200 pounds, is too great for such lightweight hip lifters. When such hip lifters are used with a heavy cow, the pipe is often bent and distorted and thus the hip lifter becomes ineffective in lifting the heavy cow.

BRIEF SUMMARY OF THE INVENTION

It is an objective of the present invention to provide a cow hip lifter that is durable and strong enough to assist in lifting and carrying of all cattle, including those that are extremely heavy.

It is another objective of the present invention to provide a cow hip lifter that may be easily and quickly applied and tightened, yet which will provide a high degree of fine adjustment for maximum efficiency in lifting and assisting in lifting cows.

It is yet another objective of the present invention to provide a cow hip lifter capable of more firmly and accurately conforming to and gripping the hip socket of a cow for assistance in lifting and carrying the cow.

The present invention achieves these objectives by providing a cow hip lifter made of strong durable pipe. The present invention reduces the angular gap between the two gripping arms of a cow hip lifter by utilizing a plate and hinge system that displaces the gripping arms from one another at the hinge point, thereby providing a smaller angular separation between the arms of the present invention than the prior art hip lifters. Further, the rounded ends of each arm of the present hip lifter, which fit the contours of the cow's hip socket, are bent inward in order to provide a better grip on the cow hip socket and to better conform the arms to the contours of the cow. This bend allows the present invention to more accurately and precisely fit the hip socket of the cow to be lifted as well. The bend also improves the efficiency of the cow hip lifter by reducing the likelihood that a cow will slip out of the hip lifter and be injured further.

The inwardly bent portions of the gripping arms of the present invention are covered with a layer of foam rubber. This layer of foam rubber decreases the likelihood of injury to the cow while further increasing the ability of the cow hip lifter to securely engage the cow hip socket for efficient lifting. The weight of the pipe used in the present invention is sufficient to lift cows in excess of 2,200 pounds completely off the ground without distortion or bending of the hip lifter or further injury of the cow.

The present invention provides a locking mechanism that allows for rapid general adjustment as well as fine adjustment for maximum efficiency in fitting the contours of the cow to be lifted with the hip lifter. To accomplish this, a chain and chain catch which can interlock are used for rapid large scale adjustments, and a ready rod assembly is used for fine adjustment. Further, a locking handle secures the chain and chain catch against inadvertent disengagement.

These and other objects and benefits of the present invention will become apparent from the following detailed description thereof taken in conjunction with the accompanying drawings, wherein like reference numerals designate like elements throughout the several views.

DESCRIPTION OF THE DRAWINGS

FIG. 1 is a perspective view of an embodiment of the cow hip lifter in place on a cow;

FIG. 2 is a perspective view of the embodiment of FIG. 1;

FIG. 3 is a side elevation view of the embodiment of the cow hip lifter shown in FIG. 2;

FIG. 4 is a an elevation view of the embodiment of the cow hip lifter taken along lines 4—4 of FIG. 3; and FIG. 5 is an enlarged top view of the locking mechanism of the embodiment of the cow hip lifter of FIG. 2.

DESCRIPTION OF THE PREFERRED EMBODIMENT

Referring to FIGS. 2–4, the livestock lift apparatus 10 may be seen in detail. The livestock lift apparatus is preferably used in aiding cattle which have been injured or have fallen, and are unable to get up. The livestock lift apparatus in its preferred embodiment is particularly applicable to use with cows. The apparatus 10 is designed to seat in the hip sockets of a cow, and may be used to assist the cow in rising from a prone position to a standing position. For this reason, the livestock lift apparatus may also be referred to as a cow hip lifter. Other livestock, however, may be assisted using the apparatus 10.

The cow hip lifter 10 is constructed largely from heavy metal pipe, preferably schedule 40, with a one inch diameter. The schedule 40 pipe is heavy enough to allow the cow hip lifter 10 to be used to assist in lifting and carrying even heavy cows weighing in excess of 2,000 pounds. The hip lifter remains light enough that it may easily be carried and placed on a cow. In its preferred embodiment, the cow hip lifter 10 weighs approximately 32 pounds.

The cow hip lifter 10 is comprised of first and second substantially U-shaped gripping arms 12 and 14. Each gripping arm has a closed end 16, 18 and an open end 20, 22, respectively. Closed ends 16 and 18 are preferably rounded to conform to the hip sockets of the cow. Those opposed ends are connected by straight arm segments 12a, 12b and 14a, 14b respectively. Each open end 20, 22 has two hinge plates 24 attached thereto. One hinge plate 24 is attached to each section of pipe forming a straight portion of the U. The hinge plates 24 are attached perpendicular to their respective hinge arms 12 and 14. The hinge plates 24 are secured to hinge arms 12 and 14 by welding. Each hinge plate 24 has a circular opening 26 through which a hinge rod 28 may be placed. The circular openings 26 of hinge plates 24 are aligned so that hinge rod 28 may be used to connect the hinge arms 12 and 14 in hinged angular engagement to form a clamp like configuration with the arms 12 and 14 separated to increase the angular gap between the arms.

A lifting handle 30 is welded to hinge rod 28. Lifting handle 30 may be used to carry cow hip lifter 10 to and from a storage area, and is also used to attach cow hip lifter 10 to a lifting device such as a bucket of a front end loader, the rafters of a barn, or a tripod stand.

Gripping arm 14 has two mount plates 32, each welded to one of the straight portions 14a and 14b of the gripping arm 14 approximately midway between its open end 22 and its rounded end 18. Each mount plate 32 has a circular opening 34. The mount plates 32 are welded to the gripping arm 14 so that the circular openings 34 are aligned to permit a cross member 36 to be rotatably mounted through the openings. A length of chain 44 may be attached directly to cross member 36. However, in the preferred embodiment, cross member 36 has a hole 38 (FIG. 5) approximately at its midpoint 39 through which threaded ready rod 40 is placed. Threaded ready rod 40 has an eyelet 42 attached at one of its ends. A length of chain 44 is attached to the eyelet 42. Fine adjustment handle 46 is threaded on to ready rod 40 by engagement with threaded opening 48.

As shown in FIG. 2, gripping arm 12 has a cross member 50 welded across the U of gripping arm 12 between arm segments 12a and 12b at a position approximately midway between its open end 20 and its rounded end 16. The cross member 50 carries apertured locking handle mount plates 52, which in turn swingably carry a locking handle 54 and its attached chain catch 56. The locking handle mount plates 52 are welded to the cross member 50 approximately at its midpoint 51. The locking handle 54 is rotatably mounted at its end 53 to the locking handle mount 52 by a pivot pin 55. The chain catch 56 is rotatably mounted at one end 58 to the locking handle 54 at a point approximately one quarter of the distance between end 53 and opposite end 57 of locking handle 54. The chain catch 56 has at its opposite end 60 a chain receiving aperture 62. The chain receiving aperture 62 is wide enough that a link of chain 44 may fit into aperture 62, but the next link of chain 44 will be unable to so fit. The chain catch 56 and the chain 44 may be fastened or removably interlocked together through the engagement of the chain 44 and the aperture 62 to prevent gripping arms 12 and 14 from spreading further apart when engaged in a locked position. The ready rod 40, eyelet 42, chain 44, adjustment handle 46, locking handle 54, and chain catch 56 may collectively be referred to as a locking and adjustment means. Ready rod 40 and adjustment handle 46 are a fine adjustment means, while chain 44, locking handle 54, and chain catch 56 are a locking means.

The rounded ends 16 and 18 of gripping arms 12 and 14 are bent toward each other at bend points 64 and 66 respectively (FIG. 3). The ends 16 and 18 are bent inward by a bend angle between a range of approximately 5 and 20 degrees, with a preferred angle of about 10 degrees, to allow the arms 12 and 14 to conform more closely to the contours of a cow being assisted by cow hip lifter 10. The rounded ends 16 and 18 are also covered with a layer of foam rubber 68 to provide extra gripping capability to the cow hip lifter 10. The inward bend of arms 12 and 14 serves to further decrease the possibility that a cow may slip out of a hip lifter 10.

The cow hip lifter 10 is shown in operation in FIG. 1. Hip lifter 10 is positioned on a cow 70 to be lifted or assisted so that its rounded ends 16 and 18 fit over the hip bones and into the hip sockets 72 of the cow. The hip sockets of a cow are strong enough to support its entire weight. The chain 44 and chain catch 56 are connected by putting a link of chain 44 in the chain receiving aperture 62, so that the hip lifter 10 is fairly secure on the cow 70. The locking handle 54 is then rotated clockwise as viewed in FIG. 2 to tighten the grip between the gripping arms 12 and 14 by the pivotal action of catch 56 over the center of the pivot pin 55. Following this rough adjustment, the fine adjustment handle 46 may be rotated to move the threaded ready rod 40 to either tighten or loosen the gripping arms 12 and 14 for maximum gripping action of cow hip lifter 10.

Cow hip lifter 10 may be attached to a lifting cable or chain 74 by hooking the lifting cable or chain to lifting handle 30. The lifting cable or lifting chain 74 may be further attached to any suitable means for lifting the weight of a cow, such as the bucket 76 of a front end loader, a pulley system, the rafters of a barn, or a tripod. The cow hip lifter 10 may be used to fully lift an injured or disabled cow from the ground in order to transport the cow to another location such as a barn.

Cow hip lifter 10 may also be used as a rehabilitation device. Use of the cow hip lifter as a rehabilitation device entails hoisting the hips of the cow into the air for a period of time and alternatively allowing the cow to stand or walk. A typical cycle of rehabilitation would have the cow hip lifter 10 being used to elevate the hips of a cow for a period of two hours, followed by a period of four, six, or eight hours in which the cow is free to walk or rest, followed by another cycle of two hours support and four, six, or eight hours free. Such a rehabilitation period would normally last for two to three days.

The detailed description outlined above is considered to be illustrative only of the principles of the invention. Numerous changes and modifications will occur to those skilled in the art, and there is no intention to restrict the scope of the invention to the detailed description. The preferred embodiments of invention having been described in detail, the scope of the invention should be defined by the following claims.

What is claimed is:

1. A livestock lift apparatus, comprising:
    first and second gripping arms, each said gripping arm having an open end and a closed end;
    said open end of said first gripping arm connected in hinged engagement with said open end of said second gripping arm;
    a cross member carried by said first gripping arm;
    locking means, comprising:
        a chain attached to said cross member;
        a locking handle mount plate attached to said second gripping arm;
        a locking handle rotatably mounted to said locking handle mount plate;
        a chain catch rotatably mounted to said locking handle;
        said chain catch having an aperture for engaging said chain; and
        said locking handle movable to a locked position wherein said arms are prevented from spreading further apart.

2. The livestock lift apparatus of claim 1, wherein said closed ends are rounded.

3. The livestock lift apparatus of claim 1, wherein said gripping arms are substantially U-shaped.

4. The livestock lift apparatus of claim 1, wherein said first and second gripping arms are constructed from schedule 40 metal pipe.

5. The livestock lift apparatus of claim 1, and further comprising a layer of foam rubber covering said first and said second closed ends.

6. The livestock lift apparatus of claim 1, wherein said closed ends are each bent toward the other at an angle between a range of 5 and 20 degrees.

7. The livestock lift apparatus of claim 6, wherein said closed ends are each bent toward the other at an angle of approximately 10 degrees.

8. The livestock lift apparatus of claim 1 wherein:
    each said open end carries two mount plates each with a circular opening;
    said mount plates positioned to align said circular openings;
    a hinge rod mounted through said openings;
    whereby said open ends are separated.

9. The livestock lift apparatus of claim 1, and further comprising:
    a fine adjustment means, comprising:
        a threaded ready rod;
        said ready rod mounted through a hole in said cross member;
        said chain mounted to said ready rod; and
        an adjustment handle threaded on said ready rod;
        whereby when said adjustment handle is rotated, said gripping arms are finely tightened or loosened.

* * * * *